June 2, 1925.  
J. SCHOLL ET AL  
BEET TOPPING MACHINE  
Filed Feb. 19, 1925
1,539,874
2 Sheets-Sheet 1
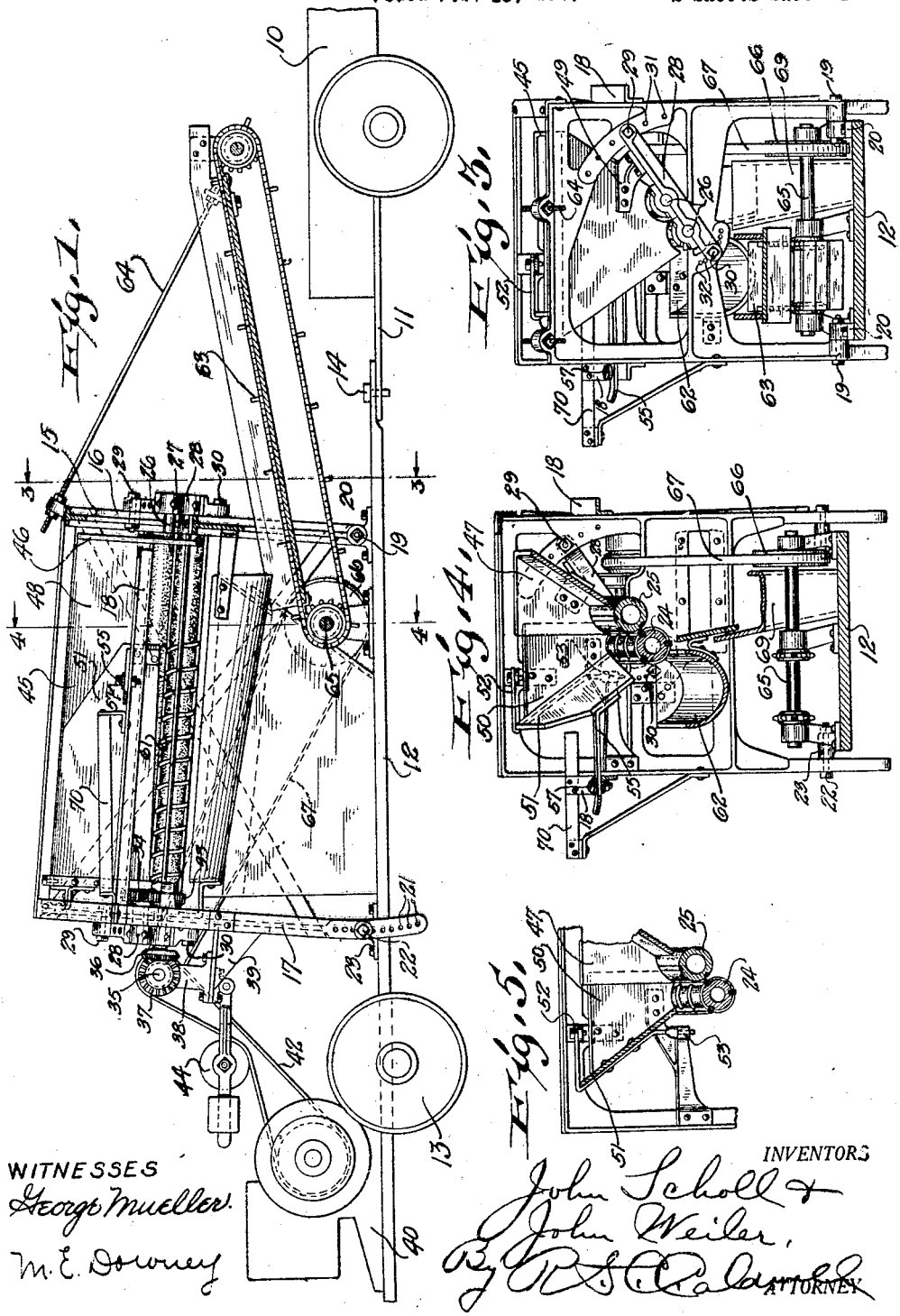
WITNESSES  
George Mueller  
M. E. Downey
INVENTORS  
John Scholl  
John Weiler  
ATTORNEY June 2, 1925.
J. SCHOLL ET AL
1,539,874
BEET TOPPING MACHINE
Filed Feb. 19, 1925
2 Sheets-Sheet 2
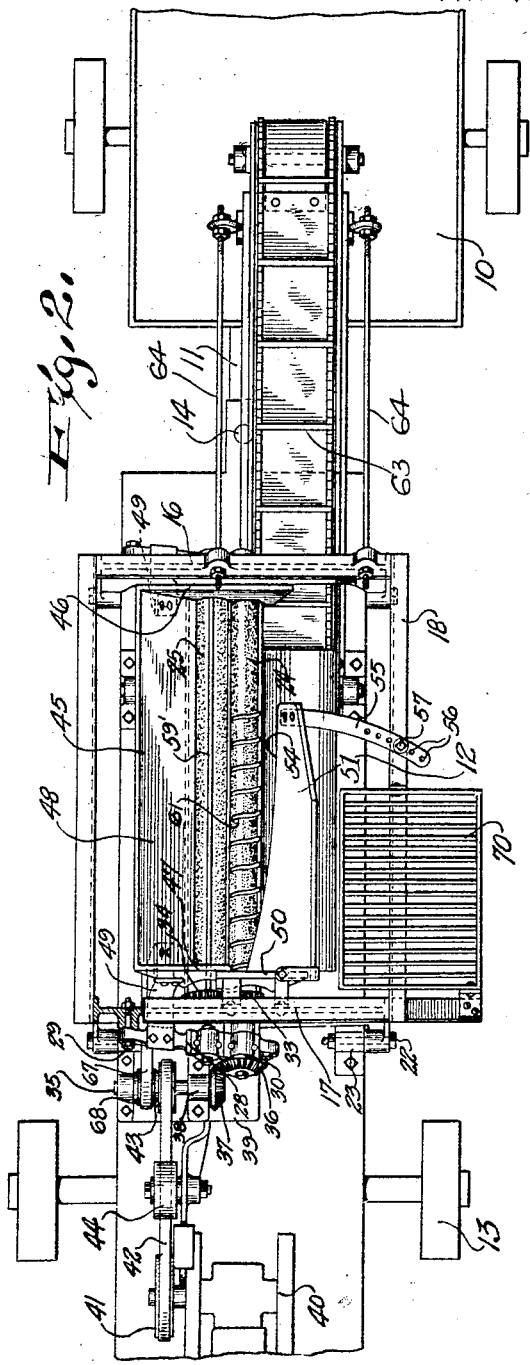
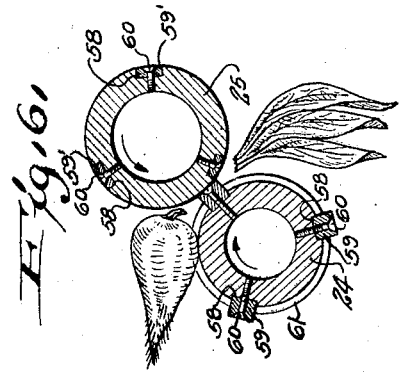
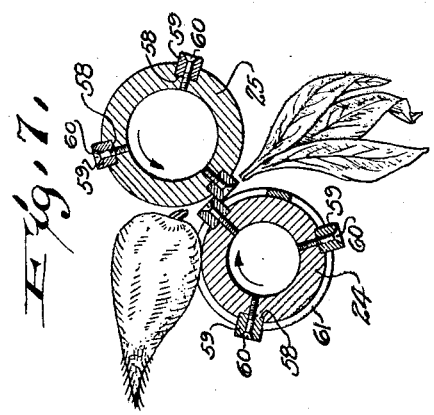
WITNESSES
George Mueller
M. E. Downey
INVENTORS
John Scholl &
John Weiler,
By R. S. C. Caldwell
ATTORNEY.

Patented June 2, 1925.

1,539,874

UNITED STATES PATENT OFFICE.

JOHN SCHOLL AND JOHN WEILER, OF BELGIUM, WISCONSIN.

BEET-TOPPING MACHINE.

Application filed February 19, 1925. Serial No. 10,300.

*To all whom it may concern:*

Be it known that we, JOHN SCHOLL and JOHN WEILER, both citizens of the United States, and residents of Belgium, in the county of Ozaukee and State of Wisconsin, have invented new and useful Improvements in Beet-Topping Machines, of which the following is a description, reference being had to the accompanying drawings, which are a part of this specification.

The invention relates to a machine for topping beets and other vegetables.

It has been found preferable to top beets in the field in order to avoid the necessity of hauling the beets to the canning factory with their leafy tops attached and later disposing of the tops at the factory. We have found the beet topping machine shown and described in our co-pending application, Serial No. 747,899, filed November 5, 1924, to be particularly useful. This machine is provided with topping rolls disposed one above the other to effect the lateral discharge of the beets as soon as they are topped, whereby a large capacity is obtained and bruising of the beets is minimized. However, to meet varying conditions, we have devised improvements to this machine, as below described.

One of the objects of the invention is to provide a machine of this type in which the height of one of the rolls above the other may be adjusted to secure more efficient topping on beets of different sizes.

Another object of the invention is to provide means for placing the rolls at an optimum longitudinal inclination whether the supporting truck be resting on the level or on a slope in the field.

A further object of the invention is to provide a beet topping machine including topping rolls and a superposed hopper providing a lateral discharge opening of adjustable width.

A further object is to provide topping rolls which may be used with beets dug from either dry or moist ground.

The invention further consists in the several features hereinafter set forth and more particularly defined by the annexed claims.

In the drawings, Fig. 1 is a side elevation of a beet topping machine embodying the invention, parts being broken away and parts being shown in section;

Fig. 2 is a plan view thereof;

Fig. 3 is a transverse sectional view taken on the line 3—3 of Fig. 1;

Fig. 4 is a similar view taken on the line 4—4 of Fig. 1;

Fig. 5 is a detail sectional view of a movable hopper board construction;

Fig. 6 is a detail transverse sectional view through the rolls; and

Fig. 7 is a similar view showing a modified roll.

In these drawings, 10 indicates a wagon provided with a draw bar 11 to which a truck 12, provided with wheels 13, is coupled by a king bolt 14. A roll-supporting frame 15 including end frame members 16 and 17 joined by suitable bracing members, such as angles 18, is adjustably secured to the wheeled truck 12 to obtain a variable inclination. For this purpose, the lower ends of the forward frame member 16 are pivotally mounted on bolts 19 extending through bearing members 20 secured to the truck 12. The lower ends of the rear frame member 17 are each provided with an arcuate series of openings 21 to receive bolts 22 adapted to enter brackets 23 on the truck 12 and thus secure the roll-supporting frame 15 on the truck at a desired inclination.

Topping rolls 24 and 25 extend between the end frame members 16 and 17, and are preferably formed of tubular metallic shells having shafts 26 secured therein and projecting from their ends, the roll 24 being journalled in bearings 27 on the end frame members 16 and 17. At their outer ends the shafts 26 of both rolls are journalled in swingable arms 28 which serve to maintain the rolls at a desired distance between centers. It will be seen that the arms 28 may be swung about the axis of the roll 24 which is journalled in the end frame members and thus permit the roll 25 to be raised thereabove at any desired height. The arms 28 are secured in position by bolts 29 and 30 at their ends passing through openings 31 and 32 in the end frame members.

The rolls 24 and 25 are drivingly connected together by gears 33 and 34 and rotate in opposite directions with their meeting peripheral portions moving downward. The roll 24 is driven from a transverse shaft 35 by a gear 36 on the roll meshing with a gear 37 on the shaft, the shaft being journalled in pedestals 38 mounted on a bracket 39 secured to the end frame member 17. An engine 40 mounted on the truck 12 is provided with a drive pulley 41 connected by a belt 42 to a pulley 43 on the shaft 35, a weighted idler 44 being preferably provided to tension the belt and to compensate for vertical adjustment of the end frame 17.

A hopper 45 is mounted above the rolls and includes end sections 46 and 47 secured to a side wall 48 which is movable with the upper roll 25 by being supported on brackets 49 which are secured to the pivoted arms 28 carrying the upper roll. A stationary end wall 50 is provided at the rear end of the rolls to cooperate with the movable end wall 47, and a laterally movable side wall 51 is pivotally mounted adjacent to it by brackets 52 and 53, which may also support the end wall 50, as shown in Fig. 5. The lower edge of the movable side wall 51 is cut away to provide a discharge opening 54 gradually increasing in width from the feeding end of the rolls, thereby preventing the discharge of newly introduced beets, and the width of the opening may be adjusted by swinging the side wall about its pivots to any desired position in which it may be held by an arm 55 secured thereto and provided with an arcuate series of openings 56 adapted to receive a bolt 57 passing through one of the side frame members 18. The side wall 51 preferably terminates short of the end wall 46 to afford unrestricted discharge of the topped beets at the lower end of the rolls.

The topping rolls 24 and 25 are each provided with longitudinally extending keyways 58 to receive cutting bars 59 held therein by screws 60 tapped into the rolls. The roll 24 is preferably provided with curved segmental members 61 extending between the cutting bars 59 to form helical feeding ribs assuring the progress of the beets along the rolls. When the cutting bars are used on both rolls they co-operate in the manner shown in Fig. 7 in which the cutting bars on roll 24 follow those on roll 25 as they enter the space between the rolls. This arrangement is preferred since the back-lash between the gears 33 and 34 will permit the cutting bars to engage, whereas the opposite arrangement would tend to cause their separation. In many instances, it is desirable to avoid projections on one of the rolls, preferably the upper roll 25, in which event filler strips 59' may be placed in the keyways 58 as indicated in Fig. 6, or the keyways may be omitted in this roll. In each case the surfaces of the rolls are roughened to insure a good purchase on the beet tops. The rolls are also made of relatively small diameter in order to top closely and to facilitate the discharge of the beets after topping. The construction of the rolls and their mounting is made sufficiently rugged to permit crushing of stones or other hard objects as they pass between the rolls, although, if desired, the yielding roll mounting shown in our prior application, above mentioned, may be used.

An inclined chute 62 is supported below and laterally of the lower roll 24 to receive the beets discharged from the rolls, and a conveyor or elevator 63 is mounted at its lower end below the discharge end of the chute and extends forwardly and upwardly above the wagon-box, where it is supported in any suitable manner, as by suspension rods 64 secured to the end frame 16. The conveyor 63 includes a sprocket-bearing shaft 65 at its lower end provided with a pulley 66 driven by a belt 67 from a pulley 68 on the shaft 35. A chute 69 may be provided below the rolls to direct the beet tops to the ground without permitting them to become entangled in moving parts.

A slatted platform 70 is supported adjacent one side of the hopper to receive the beets before they are placed in the hopper. This permits the loose dirt clinging to the beets to be shaken off and also affords facility for removing the larger stones which might damage the rolls.

In operation, the beets are placed in the hopper at the upper end of the rolls and are moved downwardly by gravity and by the action of the feed ribs 61 to make room for following beets. At the same time the leafy tops are drawn between the rolls with the aid of the roughened surfaces thereon and are severed by the cutting bars 59. It has been found that when the ground is sticky it is preferable to omit the cutting bars on one of the rolls, as shown in Fig. 6. As soon as the tops are severed, the beets topple laterally and are discharged through the opening 54 into the chute 62 whence they are carried by the elevator 63 into the wagon-box, while the tops are discharged to the ground through the chute 69.

As harvested beets may vary in size, it is desirable to adjust the height of the upper roll to permit the beets to become discharged as soon as topped, it being noted that the smaller beets require the greater height to avoid retention in the space between the rolls. It is also desirable to adjust the width of the discharge opening 54 according to the size of the beets, in order to insure proper topping and prompt discharge of topped beets.

The machine is moved along the field to keep pace with the harvesters but usually remains in one position for a period of time, so that when placed on a slope in the field, the proper longitudinal inclination of the topping rolls may be had by vertically adjusting the rear end frame of the roll-supporting structure.

What we claim as new and desire to secure by Letters Patent is:

1. In a beet topping machine, the combination of a pair of beet-supporting rolls rotatable in opposite directions to sever the beet tops between them, one of said rolls being disposed laterally of and below the other to permit lateral discharge of the beets from the lower roll after being topped, and means for adjusting the relative elevation of said rolls for operation on beets of different sizes.

2. In a beet topping machine, the combination with a supporting frame, a pair of topping rolls mounted therein, a hopper disposed above the rolls, and swingable bearing members in which the rolls are journalled at their ends adapted to be secured to said supporting frame at different inclinations, whereby one of said rolls may be disposed laterally of and below the other at varying relative elevations to permit the lateral discharge of different sized beets from the lower roll after topping.

3. In a beet topping machine, the combination of a pair of topping rolls along which the beets are fed, one of said rolls being disposed below the other to afford lateral discharge of the beets therefrom after topping, a hopper disposed above the rolls and having side walls extending adjacent thereto, one of said walls being spaced from the lower roll to provide a discharge opening for the beets, and means for moving said side wall relative to said lower roll to obtain varying widths of the discharge opening.

4. In a beet topping machine, the combination of a pair of topping rolls along which the beets are fed, one of said rolls being disposed below the other to afford lateral discharge of the beets therefrom after topping, a hopper disposed above the rolls and having its side walls extending adjacent the rolls, one of said walls being spaced from the lower roll to provide a discharge opening increasing in width in the direction in which the beets are fed and said wall being pivotally mounted adjacent the feeding end of the rolls, whereby said discharge opening may be varied in width to accommodate different sized beets.

5. In a beet topping machine, the combination, with a wheeled truck, of a frame pivotally mounted thereon and including end frame members, a pair of topping rolls extending between said members, and means for varying the height of said roll-supporting frame to vary the longitudinal inclination of said topping rolls.

6. In a beet topping machine, the combination of a pair of spaced end frames, a pair of topping rolls extending between said frames, bearing members carried by said frames and in which said rolls are journalled, means for securing said bearing members to said end frames to provide for adjustably positioning one of said rolls above the other, and a hopper disposed above the rolls and having parts thereof carried by said bearing members to move said hopper upon the adjustment of said rolls.

7. In a beet topping machine, the combination of a pair of spaced end frames, a pair of topping rolls extending between said end frames, bearings on said end frames in which one of said rolls is journalled, bearing brackets pivotally mounted on said last-named roll at said end frames and having the other of said rolls journalled therein to permit one of said rolls to be disposed above the other at varying relative elevations, and means for securing said bearing brackets to said end frames in adjusted angular positions.

In testimony whereof, we affix our signatures.

JOHN SCHOLL.
JOHN WEILER.